: US011812063B2

United States Patent
Wang et al.

(10) Patent No.: US 11,812,063 B2
(45) Date of Patent: Nov. 7, 2023

(54) VIDEO CODING USING PARAMETER SETS

(71) Applicant: Bytedance Inc., Los Angeles, CA (US)

(72) Inventors: Ye-kui Wang, San Diego, CA (US); Li Zhang, San Diego, CA (US); Kai Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/957,139

(22) Filed: Sep. 30, 2022

(65) Prior Publication Data

US 2023/0044662 A1  Feb. 9, 2023

Related U.S. Application Data

(63) Continuation of application No. PCT/US2021/025351, filed on Apr. 1, 2021.

(60) Provisional application No. 63/006,054, filed on Apr. 6, 2020.

(51) Int. Cl.
*H04N 19/70* (2014.01)
*H04N 19/172* (2014.01)
*H04N 19/174* (2014.01)
*H04N 19/169* (2014.01)

(52) U.S. Cl.
CPC .......... *H04N 19/70* (2014.11); *H04N 19/172* (2014.11); *H04N 19/174* (2014.11); *H04N 19/188* (2014.11)

(58) Field of Classification Search
CPC .................................................. H04N 19/115
USPC ................................................... 375/240.02
See application file for complete search history.

(56) References Cited

U.S. PATENT DOCUMENTS

| | | |
|---|---|---|
| 2005/0180512 A1 | 8/2005 | Narasimhan et al. |
| 2014/0355692 A1* | 12/2014 | Ramasubramonian ...................... H04N 19/573 375/240.26 |
| 2016/0212437 A1* | 7/2016 | Tsukuba ................. H04N 19/36 |
| 2016/0255359 A1 | 9/2016 | Yu et al. |
| 2017/0134742 A1* | 5/2017 | Deshpande .......... H04N 19/184 |
| 2018/0277164 A1 | 9/2018 | Wang et al. |
| 2018/0295382 A1* | 10/2018 | Liu ....................... H04N 19/593 |
| 2019/0068964 A1 | 2/2019 | Kadono et al. |
| 2020/0053392 A1 | 2/2020 | Hannuksela |

(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

*Primary Examiner* — Yulin Sun
(74) *Attorney, Agent, or Firm* — Conley Rose, P.C.

(57) ABSTRACT

A video processing method includes performing a conversion between a video comprising one or more pictures and a bitstream of the video according to a format rule. The format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

20 Claims, 16 Drawing Sheets

(56) References Cited

U.S. PATENT DOCUMENTS

2022/0094909 A1* 3/2022 Hannuksela ......... H04N 19/174
2022/0132148 A1 4/2022 Wang

OTHER PUBLICATIONS

Document: JVET-R0052-v1, Hsiang, S., et al., "AHG9: Overhead reduction for picture header and slice header," Joint Video Experts Team (JVET) of ITU-T SG 16 WP 3 and ISO/IEC JTC 1/SC 29/WG 11 18th Meeting: by teleconference, Apr. 15-24, 2020, 13 pages.

Document: JVET-R0151-v3, Sauer, J., et al. "AHG6/AHG12: Uncoded subpictures and potential applications," Joint Video Experts Team (JVET) of ITU-T SG 16 WP 3 and ISO/IEC JTC 1/SC 29/WG 11 18th Meeting: by teleconference, Apr. 15-24, 2020, 12 pages.

"Information technology—High efficiency coding and media delivery in heterogeneous environments—Part 2: High Efficiency Video Coding," ISO/IEC JTC 1/SC 29/WG 11 N 17661, Text of DIS ISO/IEC 23008-2:201x (4th ed.), Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Oct. 18, 2022, 3 pages.

Document: JVET-R0267, Coban, M., et al., "AHG9/AHG12: On mixed NAL unit types," Joint Video Experts Team JVET) of ITU-T SG 16 WP 3 and ISO/IEC JTC 1/SC 29/WG 11 18th Meeting: by teleconference, Apr. 15-24, 2020, 7 pages.

Document: JVET-R0191-r1, Hendry, "AHG9: On miscellaneous updates for HLS signalling," Joint Video Experts Team (JVET) of ITU-T SG 16 WP 3 and ISO/IEC JTC 1/SC 29/WG 11 18th Meeting: by teleconference, Apr. 15-24, 2020, 5 pages.

Document: JVET-R0042-v1, Wang, Y-K., "AHG8/AHG9/AHG12: On mixed subpicture types within a picture," Joint Video Experts Team (JVET) of ITU-T SG 16 WP 3 and ISO/IEC JTC 1/SC 29/WG 11 18th Meeting: by teleconference, Apr. 15-24, 2020, 10 pages.

Document: JVET-R0065-v1, Wang, Y-K., "AHG8/AHG9: On IRAP and GDR AUs," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Document: JVET-R0063-v1, Zhang, L., et al., "AHG9: Signalling of LMCS control," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-R0064-v1, Wang, Y-K., et al., "AHG9: Signalling of scaling list control," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Schierl, T., et al., "System Layer Integration of High Efficiency Video Coding," IEEE Transactions on Circuits and Systems for Video Technology, vol. 22, No. 12, Dec. 2012, 14 pages.

Communication From a Related Counterpart Application, PCT Application No. POCT/US2021/025351, International Search Report dated Aug. 17, 2021, 17 pages.

Communication From a Related Counterpart Application, PCT Application No. POCT/US2021/026534, International Search Report dated Sep. 10, 2021, 33 pages.

Non-Final Office Action dated Mar. 30, 2023, 14 pages, U.S. Appl. No. 17/964,396, filed Oct. 12, 2022.

* cited by examiner

700

702

Performing a conversion between a video comprising one or more pictures and a bitstream of the video according to a format rule,
and
wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

712 — Performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

FIG. 7B

720

722 — Performing a conversion between a video comprising one or more layers comprising one or more pictures comprising one or more slices and a bitstream of the video according to a format rule, and wherein the format rule specifies that a syntax element is included in a picture header or a slice header to indicate whether bidirectionally predicted (B) slices are allowed or used for a corresponding picture or slice of the video.

Performing a conversion between a video comprising one or more layers comprising one or more pictures comprising one or more slices and a bitstream of the video according to a format rule, and
wherein the format rule specifies that one or more syntax elements related to enablement or use of a coding mode at a slice level are included at most once between either a picture header or a slice header according to a second rule. — 732

742 — Performing a conversion between a video comprising one or more pictures and a bitstream of the video according to a format rule,
and
wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

Performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

Performing a conversion between a video comprising one or more pictures and a bitstream of the video according to a format rule, and
wherein the format rule specifies that use of a reference picture list during the conversion of a coded layer video sequence depends on allowed slice types in a picture corresponding to the coded layer video sequence of the video.

Performing a conversion between a video and a bitstream of the video according to a format rule, and wherein the format rule specifies that a first parameter set and a second parameter set are dependent on each other such that whether or how to include a syntax element in the second parameter set is based on the first parameter set.

FIG. 71

VIDEO CODING USING PARAMETER SETS

CROSS REFERENCE TO RELATED APPLICATIONS

This application is a continuation of International Patent Application No. PCT/US2021/025351, filed on Apr. 1, 2021 which claims the priority to and benefits of U.S. Application No. 63/006,054, filed on Apr. 6, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

In another example aspect, another video processing method is disclosed. The method includes performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

In another example aspect, another video processing method is disclosed. The method includes performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

In another example aspect, another video processing method is disclosed. The method includes performing a conversion between a video comprising one or more video pictures comprising one or more subpictures wherein the coded representation conforms to a format rule, wherein the format rule specifies a processing of a noncoded subpicture of a video picture.

In another example aspect, another video processing method is disclosed. The method includes performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

In another example aspect, another video processing method is disclosed. The method includes performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

In another example aspect, another video processing method is disclosed. The method includes performing a conversion between a video comprising one or more layers comprising one or more pictures comprising one or more slices and a bitstream of the video according to a format rule, and wherein the format rule specifies that a syntax element is included in a picture header or a slice header to indicate whether bidirectionally predicted (B) slices are allowed or used for a corresponding picture or slice of the video.

In another example aspect, another video processing method is disclosed. The method includes performing a conversion between a video comprising one or more layers comprising one or more pictures comprising one or more slices and a bitstream of the video according to a format rule, and wherein the format rule specifies that one or more syntax elements related to enablement or use of a coding mode at a slice level are included at most once between either a picture header or a slice header according to a second rule.

In another example aspect, another video processing method is disclosed. The method includes performing a conversion between a video comprising one or more pictures and a bitstream of the video according to a format rule, and wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

In another example aspect, another video processing method is disclosed. The method includes performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

In another example aspect, another video processing method is disclosed. The method includes performing a conversion between a video comprising one or more pictures and a bitstream of the video according to a format rule, wherein the format rule specifies that use of a reference picture list during the conversion of a coded layer video sequence depends on allowed slice types in a picture corresponding to the coded layer video sequence of the video.

In another example aspect, another video processing method is disclosed. The method includes performing a conversion between a video and a bitstream of the video including one or more video sequences according to a format rule, and wherein the format rule specifies whether or under which condition two adaptation parameter sets in a video sequence or in the bitstream are allowed to have a same adaptation parameter set identifier.

In another example aspect, another video processing method is disclosed. The method includes performing a conversion between a video and a bitstream of the video according to a format rule, and wherein the format rule specifies that a first parameter set and a second parameter set are dependent on each other such that whether or how to include a syntax element in the second parameter set is based on the first parameter set.

In another example aspect, another video processing method is disclosed. The method includes performing a conversion between a video comprising one or more pictures, each picture comprising one or more subpictures, and a bitstream of the video according to a format rule, wherein the format rule specifies a processing of a noncoded subpicture of a picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 7A to 7J are flowcharts for methods of video processing, in accordance with various examples.

DETAILED DESCRIPTION

Figure 1:
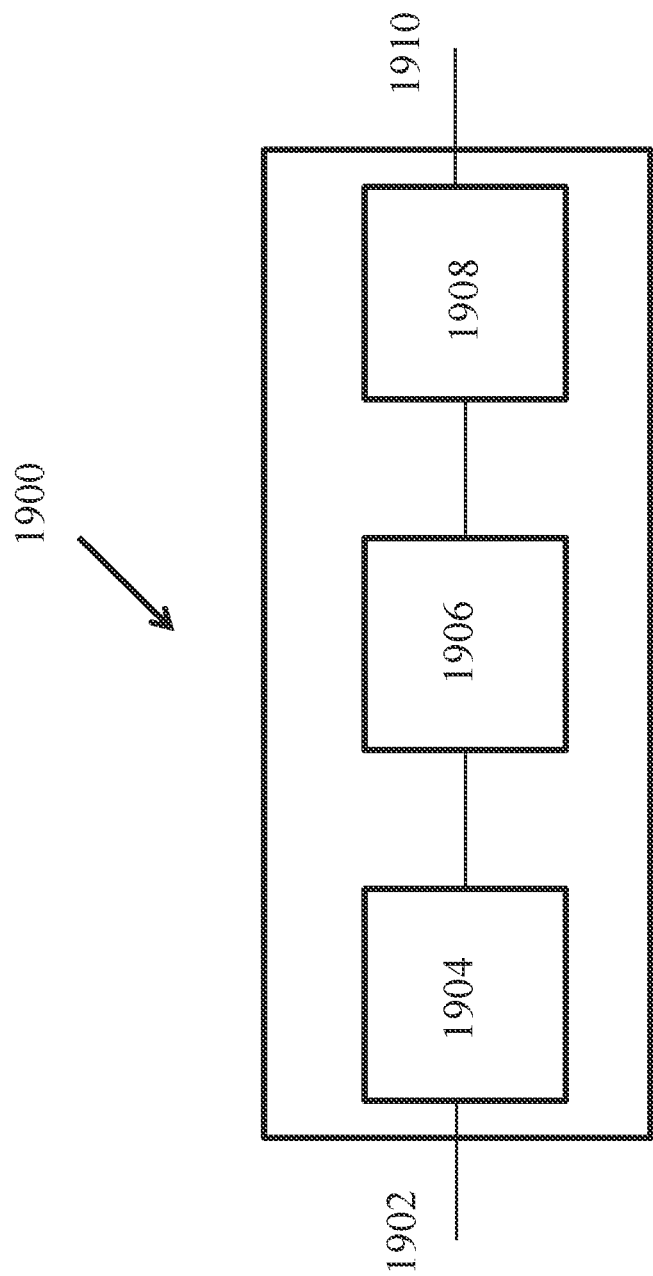
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In this document, certain embodiments are shown as changes to the current Versatile Video Coding (VVC) specification in which new text is added showing boldface italics and deleted text is marked with double brackets (e.g., [[a]] indicates the deletion of the character "a").

1. Introduction

This document is related to video coding technologies. Specifically, it is about improvements on signaling of allowed slice types and related coding tools that are only applicable to bi-predicted slices, and support of non-coded subpictures. The ideas may be applied individually or in various combination, to any video coding standard or non-standard video codec that supports multi-layer video coding, e.g., the being-developed Versatile Video Coding (VVC).

2. Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The latest VVC working draft (draft 8), JVET-Q2001_vE, was updated by the 17$^{th}$ JVET meeting held Jan. 7-17, 2020, in Brussels, Belgium.

The VVC project is now aiming for technical completion Final Draft International Standard (FDIS) at the July 2020 meeting.

3.1. Parameter Sets

AVC, HEVC, and VVC specify parameter sets. The types of parameter sets include Sequence Parameter Set (SPS), Picture Parameter Set (PPS), Adaptation Parameter Set (APS), and Video Parameter Set (VPS). SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.1.1. Video Parameter Set (VPS)

The syntax table and semantics of multiple syntax elements in the latest VVC draft text (JVET-Q2001-vE/v15) are defined as follows:

7.3.2.2 Video Parameter Set Raw Byte Sequence Payload (RBSP) Syntax

|  | Descriptor |
|---|---|
| video_parameter_set_rbsp( ) { |  |
|   vps_video_parameter_set_id | u(4) |
|   vps_max_layers_minus1 | u(6) |

-continued

|  | Descriptor |
|---|---|
|   vps_max_sublayers_minus1 | u(3) |
|   if( vps_max_layers_ minus1 > 0 && vps_max_sublayers_minus1 > 0 ) |  |
|     vps_all_layers_same_ num_sublayers_flag | u(1) |
|   if( vps_max_layers_minus1 > 0 ) |  |
|     vps_all_independent_layers_flag | u(1) |
| ... |  |
|   if( !vps_all_independent_ layers_flag ) |  |
|     vps_num_dpb_params | ue(v) |
|   if( vps_num_dpb_params > 0 && vps_max_sublayers_minus1 > 0 ) |  |
|     vps_sublayer_dpb_ params_present_flag | u(1) |
|   for( i = 0; i < vps_num_ dpb_params; i++ ) { |  |
|     if( vps_max_sublayers_ minus1 > 0 && !vps_all_layers_same_ num_sublayers_flag ) |  |
|       dpb_max_temporal_id[ i ] | u(3) |
|     dpb_parameters( dpb_ max_temporal_id[ i ], vps_sublayer_dpb_params_ present_flag ) |  |
|   } |  |
| ... |  |
| } |  |

3.1.2. Sequence Parameter Set (SPS)

The syntax table and semantics of multiple syntax elements in the latest VVC draft text (JVET-Q2001-vE/v15) are defined as follows:

7.3.2.3 Sequence Parameter Set RBSP Syntax

|  | Descriptor |
|---|---|
| seq_parameter_set_rbsp( ) { |  |
|   sps_seq_parameter_set_id | u(4) |
|   sps_video_parameter_set_id | u(4) |
| ... |  |
|   sps_entropy_coding_ sync_enabled_flag | u(1) |
|   if( sps_entropy_coding_ sync_enabled_flag ) |  |
|     sps_wpp_entry_point_ offsets_present_flag | u(1) |
|   sps_weighted_pred_flag | u(1) |
|   sps_weighted_bipred_flag | u(1) |
|   log2_max_pic_order_ cnt_lsb_minus4 | u(4) |
|   sps_poc_msb_flag | u(1) |
|   if( sps_poc_msb_flag ) |  |
|     poc_msb_len_minus1 | ue(v) |
|   num_extra_ph_bits_bytes | u(2) |
|   extra_ph_bits_struct( num_ extra_ph_bits_bytes ) |  |
|   num_extra_sh_bits_bytes | u(2) |
|   extra_sh_bits_struct( num_ extra_sh_bits_bytes ) |  |
|   if( sps_max_sublayers_ minus1 > 0 ) |  |
|     sps_sublayer_dpb_ params_flag | u(1) |
|   if( sps_ptl_dpb_hrd_ params_present_flag ) |  |
|     dpb_parameters( sps_max_ sublayers_minus1, sps_sublayer_dpb_params_flag ) |  |
|   long_term_ref_pics_flag | u(1) |

| | Descriptor |
|---|---|
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| ... | |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag ) | |
|   sps_dmvr_pic_present_flag | u(1) |
| sps_mmvd_enabled_flag | u(1) |
| ... | |
| if( sps_transform_skip_enabled_flag \|\| sps_palette_enabled_flag ) | |
|   min_qp_prime_ts_minus4 | ue(v) |
| sps_bcw_enabled_flag | u(1) |
| sps_ibc_enabled_flag | u(1) |
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| ... | |
| } | |

3.1.3. General Constraint Flag
7.3.3.2 General Constraint Information Syntax

| | Descriptor |
|---|---|
| general_constraint_info( ) { | |
|   ... | |
|   general_non_projected_constraint_flag | u(1) |
|   intra_only_constraint_flag | u(1) |
|   max_bitdepth_constraint_idc | u(4) |
|   max_chroma_format_constraint_idc | u(2) |
|   no_res_change_in_clvs_constraint_flag | u(1) |
|   one_tile_per_pic_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_ref_wraparound_constraint_flag | u(1) |
|   no_temporal_mvp_constraint_flag | u(1) |
|   no_sbtmvp_constramt_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_affine_motion_constraint_flag | u(1) |
|   no_bcw_constraint_flag | u(1) |
|   no_ibc_constraint_flag | u(1) |
|   no_ciip_constraint_flag | u(1) |
|   no_fpel_mmvd_constraint_flag | u(1) |
|   no_gpm_constraint_flag | u(1) |
|   ... | |
| } | | no_bdof_constraint_flag equal to 1 specifies that sps_bdof_enabled_flag shall be equal to 0. no_bdof_constraint_flag equal to 0 does not impose such a constraint.

no_dmvr_constraint_flag equal to 1 specifies that sps_dmvr_enabled_flag shall be equal to 0. no_dmvr_constraint_flag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_ciip_constraint_flag equal to 1 specifies that sps_ciip_enabled_flag shall be equal to 0. no_cipp_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

3.1.4. Picture Parameter Set (PPS)
The syntax table and semantics of multiple syntax elements in the latest VVC draft text (JVET-Q2001-vE/v15) are defined as follows:

7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   ... | |
|   cabac_init_present_flag | u(1) |
|   for( i = 0; i < 2; i++ ) | |
|     num_ref_idx_default_active_minus1[ i ] | ue(v) |
|   ... | |
|   pps_weighted_pred_flag | u(1) |
|   pps_weighted_bipred_flag | u(1) |
|   deblocking_filter_control_present_flag | u(1) |
|   ... | |
| } | | num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1 [i] shall be in the range of 0 to 14, inclusive.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

3.1.5. DPB Parameters Syntax
The syntax table and semantics of multiple syntax elements in the latest VVC draft text (JVET-Q2001-vE/v15) are defined as follows:

7.3.4 DPB Parameters Syntax

| | Descriptor |
|---|---|
| dpb_parameters<br>( maxSubLayersMinus1,<br>subLayerInfoFlag ) {<br>  for( i = ( subLayerInfoFlag ? 0 :<br>  maxSubLayersMinus1 );<br>    i <= maxSubLayersMinus1;<br>    i++ ) {<br>    max_dec_pic_buffering_<br>    minus1[ i ]<br>    max_num_reorder_pics[ i ]<br>    max_latency_increase_<br>    plus1[ i ]<br>  }<br>} | <br><br><br><br><br><br><br>ue(v)<br><br>ue(v)<br>ue(v) |

7.4.5 DPB Parameters Semantics

The dpb_parameters( ) syntax structure provides information of Decoded Picture Buffer (DPB) size, maximum picture reorder number, and maximum latency for one or more Output Layer Sets (OLSs).

When a dpb_parameters( ) syntax structure is included in a VPS, the OLSs to which the dpb_parameters( ) syntax structure applies are specified by the VPS. When a dpb_parameters( ) syntax structure is included in an SPS, it applies to the OLS that includes only the layer that is the lowest layer among the layers that refer to the SPS, and this lowest layer is an independent layer.

max_dec_pic_buffering_minus1[i] plus 1 specifies the maximum required size of the DPB in units of picture storage buffers when Htid is equal to i. The value of max_dec_pic_buffering_minus1[i] shall be in the range of 0 to MaxDpbSize−1, inclusive, where MaxDpbSize is as specified in clause A.4.2. When i is greater than 0, max_dec_pic_buffering_minus1[i] shall be greater than or equal to max_dec_pic_buffering_minus1[i−1]. When max_dec_pic_buffering_minus1[i] is not present for i in the range of 0 to maxSubLayersMinus1−1, inclusive, due to subLayerInfoFlag being equal to 0, it is inferred to be equal to max_dec_pic_buffering_minus1[maxSubLayersMinus1].

max_num_reorder_pics[i] specifies the maximum allowed number of pictures of the OLS that can precede any picture in the OLS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[maxSubLayersMinus1].

max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

When max_latency_increase_plus1[i] is not equal to 0, the value of MaxLatencyPictures[i] is specified as follows:

$$\text{MaxLatencyPictures}[i] = \text{max\_num\_reorder\_pics}[i] + \text{max\_latency\_increase\_plus1}[i] - 1 \quad (7\text{-}110)$$

When max_latency_increase_plus1[i] is equal to 0, no corresponding limit is expressed. The value of max_latency_increase_plus1[i] shall be in the range of 0 to $2^{32}-2$, inclusive. When max_latency_increase_plus1[i] is not present for i in the range of 0 to maxSubLayersMinus1−1, inclusive, due to subLayerInfoFlag being equal to 0, it is inferred to be equal to max_latency_increase_plus1[maxSubLayersMinus1].

3.2. Picture Header (PH) and Slice Header (SH) in VVC

Similarly, as in HEVC, the slice header in VVC conveys information for a particular slice. This includes slice address, slice type, slice quantization parameter (QP), picture order count (POC) least significant bits (LSBs), Reference Picture Set (RPS) and Reference Picture List (RPL) information, weighted prediction parameters, loop filtering parameters, entry offsets of tiles and Wavefront Parallel Processing (WPP), etc.

VVC introduced the picture header (PH), which contains header parameters for a particular picture. Each picture must have one or only one PH. The PH generally carries those parameters that would have been in the slice header if PH were not introduced but each has the same value for all slices of a picture. These include Intra Random Access Point (IRAP)/Gradual Decoding Refresh (GDR) picture indications, inter/intra slices allowed flags, POC LSB and optionally POC most significant bit (MSB), information on RPLs, deblocking, Sample Adaptive Offset (SAO), Adaptive Loop Filter (ALF), QP delta, and weighted prediction, coding block partitioning information, virtual boundaries, co-located picture information, etc. It often occurs that each picture in an entire sequence of pictures contains only one slice. To allow not to have at least two Network Abstraction Layer (NAL) units for each picture in such cases, the PH syntax structure is allowed to be included either the PH NAL unit or in the slice header.

In VVC, information on the collocated picture, which is used for temporal motion vector prediction, is signaled either in the picture header or the slice header.

3.2.1. Picture Header (PH)

The syntax table and semantics of multiple syntax elements in the latest VVC working draft ( ) are defined as follows:

7.3.2.7 Picture Header Structure Syntax

| | Descriptor |
|---|---|
| picture_header_structure( ) {<br>  gdr_or_irap_pic_flag<br>  if( gdr_or_irap_pic_flag )<br>    gdr_pic_flag<br>  ph_inter_slice_allowed_flag<br>  if( ph_inter_slice_allowed_flag )<br>    ph_intra_slice_allowed_flag<br>  non_reference_picture_flag<br>...<br>  if( sps_temporal_mvp_<br>    enabled_flag ) {<br>    ph_temporal_mvp_<br>    enabled_flag<br>    if( ph_temporal_mvp_<br>enabled_flag &&<br>rpl_info_in_ph_flag ) {<br>      ph_collocated_from_l0_flag<br>      if( ( ph_collocated_<br>        from_l0_flag &&<br>num_ref_entries[ 0 ]<br>[ RplsIdx[ 0 ] ] > 1 ) | |<br>( !ph_collocated_<br>from_l0_flag &&<br>num_ref_entries[ 1 ]<br>[ RplsIdx[ 1 ] ] > 1 ) ) | <br>u(1)<br><br>u(1)<br>u(1)<br><br>u(1)<br>u(1)<br><br><br><br>u(1) <br><br><br><br><br>u(1) |

| | Descriptor |
|---|---|
| ph_collocated_ref_idx | ue(v) |
| } | |
| } | |
| ... | |
| mvd_l1_zero_flag | u(1) |
| if( sps_fpel_mmvd_ enabled_flag ) | |
| ph_fpel_mmvd_enabled_flag | u(1) |
| if( sps_bdof_pic_present_flag ) | |
| ph_disable_bdof_flag | u(1) |
| if( sps_dmvr_pic_present_flag ) | |
| ph_disable_dmvr_flag | u(1) |
| if( sps_prof_pic_present_flag ) | |
| ph_disable_prof_flag | u(1) |
| if( ( pps_weighted_pred_flag \|\| pps_weighted_bipred_flag ) && wp_info_in_ph_flag ) | |
| pred_weight_table( ) | |
| } | |
| ... | |

3.2.2. Slice Header (SH)

The syntax table and semantics of multiple syntax elements in the latest VVC working draft ( ) are defined as follows:

7.3.7.1 General Slice Header Syntax

| | Descriptor |
|---|---|
| slice_header( ) { | |
| picture_header_in_slice_header_flag | u(1) |
| if( picture_header_in_ slice_header_flag ) | |
| picture_header_structure( ) | |
| if( subpic_info_present_flag ) | |
| slice_subpic_id | u(v) |
| if( ( rect_slice_flag && NumSlicesInSubpic [ CurrSubpicIdx ] > 1 ) \|\| | |
| ( !rect_slice_flag && NumTilesInPic > 1 ) ) | |
| slice_address | u(v) |
| for( i = 0; i < NumExtraShBits; i++ ) | |
| sh_extra_bit[ i ] | u(1) |
| if( !rect_slice_flag && NumTilesInPic > 1 ) | |
| num_tiles_in_slice_minus1 | ue(v) |
| if( ph_inter_slice_allowed_flag ) | |
| slice_type | ue(v) |
| if( sps_alf_enabled_flag && !alf_info_in_ph_flag ) { | |
| slice_alf_enabled_flag | u(1) |
| if( slice_alf_enabled_flag ) { | |
| slice_num_alf_aps_ids_luma | u(3) |
| for( i = 0; i < slice_num_ alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| if( sps_ccalf_enabled_flag ) { | |
| slice_cc_alf_cb_enabled_flag | u(1) |
| if( slice_cc_alf_cb_ enabled_flag ) | |
| slice_cc_alf_cb_aps_id | u(3) |
| slice_cc_alf_cr_enabled_flag | u(1) |
| if( slice_cc_alf_cr_ enabled_flag ) | |
| slice_cc_alf_cr_aps_id | u(3) |
| } | |
| } | |
| } | |
| if( separate_colour_plane_flag == 1 ) | |
| colour_plane_id | u(2) |
| if( !rpl_info_in_ph_flag && ( ( nal_unit_type != IDR_W_RADL && nal_unit_type != IDR_N_LP ) \|\| sps_ idr_rpl_present_flag ) ) | |
| ref_pic_lists( ) | |
| if( ( rpl_info_in_ph_flag \|\| ( ( nal_unit_type != IDR_W_RADL && nal_unit_type != IDR_N_LP ) \|\| sps_ idr_rpl_present_flag ) ) && ( ( slice_type != I && num_ref_entries[ 0 ][ RplsIdx [ 0 ] ] > 1 ) \|\| ( slice_type == B && num_ref_entries[ 1 ][ RplsIdx [ 1 ] ] > 1 ) ) ) { | |
| num_ref_idx_active_override_flag | u(1) |
| if( num_ref_idx_active_ override_flag ) | |
| for( i = 0; i < ( slice_type == B ? 2: 1 ); i++ ) | |
| if( num_ref_entries[ i ] [ RplsIdx[ i ] ] > 1 ) | |
| num_ref_idx_active_ minus1[ i ] | ue(v) |
| } | |
| if( slice_type != I ) { | |
| if( cabac_init_present_flag ) | |
| cabac_init_flag | u(1) |
| if( ph_temporal_mvp_enabled_ flag && !rpl_info_in_ph_flag ) { | |
| if( slice_type == B ) | |
| slice_collocated_ from_l0_flag | u(1) |
| if( ( slice_collocated_ from_l0_flag && NumRefIdxActive[ 0 ] > 1 ) \|\| ( ! slice_collocated_ from_l0_flag && NumRefIdxActive[ 1 ] > 1 ) ) | |
| slice_collocated_ref_idx | ue(v) |
| } | |
| if( !wp_info_in_ph_flag && ( ( pps_weighted_pred_flag && slice_type == P ) \|\| ( pps_weighted_bipred_ flag && slice_type == B ) ) ) | |
| pred_weight_table( ) | |
| } | |
| if( !qp_delta_info_in_ph_flag ) | |
| slice_qp_delta | se(v) |
| if( pps_slice_chroma_qp_ offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( pps_cu_chroma_qp_offset_ list_enabled_flag ) | |
| cu_chroma_qp_offset_ enabled_flag | u(1) |
| if( sps_sao_enabled_flag && !sao_info_in_ph_flag ) { | |

-continued

| | Descriptor |
|---|---|
| slice_sao_luma_flag | u(1) |
| if( ChromaArrayType != 0 ) | |
| slice_sao_chroma_flag | u(1) |
| } | |
| ... | |
| } | | slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice type is inferred to be equal to 2.
When ph_intra_slice_allowed_flag is equal to 0, the value of slice type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

3.3. Recent Progress in JVET-R0052

In JVET-R0052 method #2, it is proposed to add one allowed type index (i.e., ph_allowed_slice_types_idc), and whether B slices are used in a picture could be derived from the newly added syntax element.

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) |

In addition, another new syntax element ph_multiple_slice_types_in_pic_flag is added to the PH structure for specifying whether more than one slice types may be present in the current picture. ph_multiple_slice_types_in_pic_flag equal to 1 specifies that coded slices of the picture may have different values of slice_type. ph_multiple_slice_types_in_pic_flag equal to 0 specifies that all coded slices of the picture have the same value of slice_type. When ph_multiple_slice_types_in_pic_flag is equal to 0, ph_slice_type is further signaled to specify the value of slice_type for all slices of the picture and slice_type in the slice header is not coded and is inferred to be equal to the value of ph_slice_type.

7.3.2.7 Picture Header Structure Syntax

| | Descriptor |
|---|---|
| picture_header_structure( ) { | |
| gdr_or_irap_pic_flag | u(1) |
| if( gdr_or_irap_pic_flag ) | |
| gdr_pic_flag | u(1) |
| if( !no_pic_partition_flag && | |
| !( rect_slice_flag && num_ | |
| slices_in_pic_minus1 == 0 ) ) | |

| | Descriptor |
|---|---|
| [[ph_inter_slice_allowed_flag]] | u(1) |
| ph_multiple_slice_types_in_pic_flag | |
| if( [[ph_inter_slice_allowed_flag]] | |
| ph_multiple_slice_types_in_pic_flag ) | |
| [[ph_intra_slice_allowed_flag]] | u(2) |
| ph_allowed_slice_types_idc | |
| else | |
| ph_slice_type | ue(v) |
| non_reference_picture_flag | u(1) |
| ph_pic_parameter_set_id | ue(v) |
| ..... | |
| if( partition_constraints_ override_enabled_flag ) | |
| partition_constraints_ override_flag | u(1) |
| if( [[ph_intra_slice_allowed_flag]] ISliceAllowed ) { | |
| if( partition_constraints_ override_flag ) { | |
| ph_log2_diff_min_qt_min_ cb_intra_slice_luma | ue(v) |
| ph_max_mtt_hierarchy_depth_ intra_slice_luma | ue(v) |
| if( ph_max_mtt_hierarchy_ depth_intra_slice_luma != 0 ) { | |
| ph_log2_diff_max_bt_min_ qt_intra_slice_luma | ue(v) |
| ph_log2_diff_max_tt_ min_qt_intra_slice_luma | ue(v) |
| } | |
| if( qtbtt_dual_tree_intra_flag ) { | |
| ph_log2_diff_min_qt_min_ cb_intra_slice_chroma | ue(v) |
| ph_max_mtt_hierarchy_depth_ intra_slice_chroma | ue(v) |
| if( ph_max_mtt_hierarchy_depth_ intra_slice_chroma != 0 ) { | |
| ph_log2_diff_max_bt_min_qt_ intra_slice_chroma | ue(v) |
| pb_log2_diff_max_tt_min_ qt_intra_slice_chroma | ue(v) |
| } | |
| } | |
| } | |
| if( cu_qp_delta_enabled_flag ) | |
| ph_cu_qp_delta_subdiv_ intra_slice | ue(v) |
| if( pps_cu_chroma_qp_offset_ list_enabled_flag ) | |
| ph_cu_chroma_qp_offset_ subdiv_intra_slice | ue(v) |
| } | |
| if( [[ph_inter_slice_allowed_flag]] BSliceAllowed \| \| PSliceAllowed ) { | |
| if( partition_constraints_ override_flag ) { | |
| ph_log2_diff_min_qt_ min_cb_inter_slice | ue(v) |
| ph_max_mtt_hierarchy_ depth_inter_slice | ue(v) |
| if( ph_max_mtt_hierarchy_ depth_inter_slice != 0 ) { | |
| ph_log2_diff_max_bt_ min_qt_inter_slice | ue(v) |
| ph_log2_diff_max_tt_ min_qt_inter_slice | ue(v) |
| } | |
| } | |
| if( cu_qp_delta_enabled_flag ) | |
| ph_cu_qp_delta_subdiv_ inter_slice | ue(v) |
| if( pps_cu_chroma_qp_offset_ list_enabled_flag ) | |

-continued

| | Descriptor |
|---|---|
| ph_cu_chroma_qp_offset_subdiv_inter_slice | ue(v) |
| if( sps_temporal_mvp_enabled_flag ) { | |
|   ph_temporal_mvp_enabled_flag | u(1) |
|   if( ph_temporal_mvp_enabled_flag && rpl_info_in_ph_flag ) { | |
|     if( BSliceAllowed ) | |
|       ph_collocated_from_l0_flag | u(1) |
|       if( ( ph_collocated_from_l0_flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) | |
|         ph_collocated_ref_idx | ue(v) |
|   } | |
| } | |
| if( BSliceAllowed ) | |
|   mvd_l1_zero_flag | u(1) |
| if( sps_fpel_mmvd_enabled_flag ) | |
|   ph_fpel_mmvd_enabled_flag | u(1) |
| if( sps_bdof_pic_present_flag && BSliceAllowed ) | |
|   ph_disable_bdof_flag | u(1) |
| if( sps_dmvr_pic_present_flag && BSliceAllowed ) | |
|   ph_disabled_mvr_flag | u(1) |
| if( sps_prof_pic_present_flag ) | |
|   ph_disable_prof_flag | u(1) |
| if( (( pps_weighted_pred_flag && PSliceAllowed ) \|\| ( pps_weighted_bipred_flag && BSliceAllowed )) && wp_info_in_ph_flag ) | |
|   pred_weight_table( ) | |
| } | |
| ..... | |
| } | |

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |

-continued

| | Descriptor |
|---|---|
|   num_tiles_in_slice_minus1 | ue(v) |
| if( [[ph_inter_slice_allowed_flag]] ph_multiple_slice_types_in_pic_flag ) | |
|   if( ph_allowed_slice_types_idc == 3 ) | |
|     slice_type | ue(v) |
|   else | |
|     slice_type_modified | u(1) |
| ..... | |
| } | |

7.3.7.2 Weighted Prediction Parameters Syntax

| | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && ( wp_info_in_ph_flag && BSliceAllowed ) ) | |
|     num_l1_weights | ue(v) |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

7.4.3.7 Picture Header Structure Semantics ph_multiple_slice_types_in_pic_flag equal to 1 specifies that coded slices of the picture may have different values of slice_type. ph_multiple_slice_types_in_pic_flag equal to 0 specifies that all coded slices of the picture have the same value of slice_type. When ph_multiple_slice_types_in_pic- _flag is not present, it is inferred to be equal to 0. ph_allowed_slice_types_idc specifies the allowed values of slice_type for coded slices in the picture according to Table X when ph_multiple_slice_types_in_pic_flag is equal to 1.

TABLE X

The allowed values of slice_type specified by ph_allowed_slice_types_idc

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) | ph_slice_type specifies the value of slice_type for all slice headers in the picture when ph_multiple_slice_types_in_pic_flag is equal to 0.
The variables BSliceAllowed, PSliceAllowed and ISliceAllowed are derived as follows:
  If ph_multiple_slice_types_in_pic_flag is equal to 0, BSliceAllowed is set equal to (ph_slice_type==B), PSliceAllowed is set equal to (ph_slice_type==P), and ISliceAllowed is set equal to (ph_slice_type==I).
  Otherwise, BSliceAllowed is set equal to (ph_allowed_slice_types_idc !=0), PSliceAllowed is set equal to (ph_allowed_slice_types_idc!=1), and ISliceAllowed is set equal to (ph_allowed_slice_types_idc!=2).
[[ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1. ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.]]
  NOTE 2—For bitstreams that are supposed to work subpicture based bitstream merging without the need of changing PH NAL units, the encoder is expected to set the values of [[both ph_inter_slice_allowed_flag and ph_intra_slice_allowed_flag]] BSliceAllowed, PSliceAllowed, and ISliceAllowed equal to 1.
7.4.8.1 General Slice Header Semantics

TABLE 9

Name association to slice_type

| slice_type | Name of slice_type |
|---|---|
| 0 | B (B slice) |
| 1 | P (P slice) |
| 2 | I (I slice) |

When not present, the value of slice types is [[inferred to be equal to 2]] derived as follows:
  If ph_multiple_slice_types_in_pic_flag is equal to 1, the value of slice_type is set equal to (slice_type_modified>=ph_allowed_slice_types_idc? slice_type_modified+1 slice_type_modified).
  Otherwise, the value of slice_type is set equal to the value of ph_slice_type.

slice_type_modified is used for deriving the value of slice_type when ph_multiple_slice_types_in_pic_flag is equal to 1 and the value of ph_allowed_slice_types_idc is not equal to 3.
[[When ph_intra_slice_allowed_flag is equal to 0, the value of slice_type shall be equal to 0 or 1.]] When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.
7.4.8.2 Weighted Prediction Parameters Semantics
num_l1_weights specifies the number of weights signaled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1]]), inclusive.
The variable NumWeightsL1 is derived as follows:

```
if( !pps_weighted_bipred_flag )
    NumWeightsL1 = 0
else if( wp_info_in_ph_flag )                                (148)
    NumWeightsL1 = BSliceAllowed ? num_l1_weights : 0
else
    NumWeightsL1 = NumRefIdxActive[ 1 ]
```

A new syntax element pps_multiple_slice_types_in_pic_flag can be further signaled in the PPS. When pps_multiple_slice_types_in_pic_flag is equal to 0, ph_multiple_slice_types_in_pic_flag is inferred to be equal to 0 for all PHs referring to the PPS.
The related modifications to VVC Draft 8 are written in red and highlighted in yellow and are provided below:
7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   ... | |
|   no_pic_partition_flag | u(1) |
|   if( !no_pic_partition_flag ) { | |
|     .... | |
|   if( !(rect_slice_flag && num_slices_in_pic_minus1 = = 0) ) | |
|     pps_multiple_slice_types_in_pic_flag | u(1) |
|     loop_filter_across_tiles_enabled_flag | u(1) |
|     loop_filter_across_slices_enabled_flag | u(1) |
|   } | |
|   ... | |
| } | |

PH of Method 1
7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   if( !no_pic_partition_flag && pps_multiple_slice_types_in_pic_flag && !( rect_slice_flag && num_slices_in_pic_minus1 = = 0 ) ) | |

| Descriptor |
| --- |
| [[ph_inter_slice_allowed_flag]] u(1)<br>ph_multiple_slice_types_in_pic_flag<br>  if( [[ph_inter_slice_allowed_flag]]<br>ph_multiple_slice_types_in_pic_flag )<br>    ph_intra_slice_allowed_flag u(1)<br>  else<br>    ph_slice_type ue(v)<br>  non_reference_picture_flag u(1)<br>  ph_pic_parameter_set_id ue(v)<br>  .....<br>} |

PH of Method 2

| Descriptor |
| --- |
| picture_header_structure( ) {<br>  gdr_or_irap_pic_flag u(1)<br>  if( gdr_or_irap_pic_flag )<br>    gdr_pic_flag u(1)<br>  if ( !no_pic_partition_flag &&<br>pps_multiple_slice_types_in_pic_flag &&<br>  !( rect_slice_flag && num_<br>    slices_in_pic_minus1 = = 0 ) )<br>  [[ph_inter_slice_allowed_flag]] u(1)<br>ph_multiple_slice_types_in_pic_flag<br>  if( [[ph_inter_slice_allowed_flag]]<br>ph_multiple_slice_types_in_pic_flag )<br>    [[ph_intra_slice_allowed_flag]] u(2)<br>    ph_allowed_slice_types_idc<br>  else<br>    ph_slice_type ue(v)<br>  non_reference_picture_flag u(1)<br>  ph_pic_parameter_set_id ue(v)<br>  .....<br>} |

7.4.3.4 Picture Parameter Set RBSP Semantics pps_multiple_slice_types_in_pic_flag equal to 1 specifies that coded slices of the picture may have different values of slice_type for all pictures referring to the PPS. pps_multiple_slice_types_in_pic_flag equal to 0 specifies that all coded slices of the picture have the same value of slice_type for all pictures referring to the PPS. When pps_multiple_slice_types_in_pic_flag is not present, the value of pps_multiple_slice_types_in_pic_flag is inferred to be equal to 0.

3.4. Uncoded Subpictures and Potential Applications in JVET-R0151

In this document it is shown how VVC can be extended with a mechanism that enables uncoded subpictures. Uncoded subpictures can be used for efficient coding when subpictures do not completely fill up a picture, by providing completely unused regions. Examples are shown for Omnidirectional Media Format (OMAF) use cases, as well as for 360° video coding of 4×3 cubemaps. Further, uncoded subpictures can be used to reserve space which is filled not with coded data, but with content generated from already coded content. Here, the example of high-level, efficient geometry padding for 360° video is shown.

4. Technical Problems Solved by Disclosed Technical Solutions

The current VVC text and recent progress in JVET have the following problems:
1. In the latest VVC draft text (in JVET-Q2001-vE/v15), two PH syntax elements related to allowed slice types are included, i.e., ph_inter_slice_allowed_flag and ph_intra_slice_allowed_flag, as tabulated in the picture header structure syntax. With these two flags, syntax elements related to I slice coding are signaled only when the ph_intra_slice_allowed_flag is true, and syntax elements related to inter slice coding are signaled only when the ph_inter_slice_allowed_flag is true. However, when ph_inter_slice_allowed_flag is equal to 1, the decoder does not know whether the picture contains B slices. Some applications, e.g., online gaming, video conference, video surveillance, often use only P and I slices. Therefore, if there is an indication of whether B slices are allowed, the decoders of such applications would be able to choose to only request/use bitstreams that do not B slices included, and in addition, the indication can be used to avoid sending of multiple unnecessary parameters.
2. In JVET-R0052, the suggested changes are only applied to PH and SH. There is no higher-level control whether it can only have the same slice types within a picture or not and/or what kinds of allowed slice types are enabled in a picture. In addition, when certain syntax elements related to bi-prediction only are not present, how to infer the values are not described.
3. In the item 1 of JVET-R0191, it is proposed to replace the constraint that the value of sps_ptl_dpb_hrd_params_present_flag shall be equal to vps_independent_layer_flag [GeneralLayerIdx[nuh_layer_id]] with the following:
The value of sps_ptl_dpb_hrd_params_present_flag shall be equal to 1 when there is an OLS that contains only one layer and the layer identifier (ID) is equal to nuh_layer_id of the SPS. However, the change introduces a VPS dependency through the condition "when there is an OLS that contains only one layer". Another issue is that for a single-layer bitstream, the value of sps_ptl_dpb_hrd_params_present_flag shall be equal to 1, and this is not captured by the changed constraint.

5. A Listing of Example Solutions and Embodiments

To solve the above problem, methods as summarized below are disclosed. The items below should be considered as examples to explain the general concepts and should not be interpreted in a narrow way. Furthermore, these items can be applied individually or combined in any manner.

One or more syntax elements may be added in parameter sets (e.g., SPS, VPS, PPS, APS, Decoding Capability Information (DCI)) and/or General constraint information syntax to indicate whether only X (e.g., I, or B or P) slice is allowed within a picture; and/or to indicate the allowed set of slice types in a picture.

In Parameter Set and General Constraint Information Syntax
1. In a video unit such as SPS or PPS, add one or multiple syntax elements (e.g., sps_allowed_slice_idc) to specify whether the allowed slice types in a picture of a Coded Layer Video Sequence (CLVS).
  1) In one example, a first syntax element (e.g., sps_allowed_slice_idc) is added, and its semantics may be defined as: sps_allowed_slice_idc equal to X specifies that a picture only allows the following allowed slice types or any combination of them:
    i. {all I}, {all P}, {all B}, {I, P}, {I, B}, {P, B}, {I, B, P}
    ii. In one example, the first syntax element may be coded with fixed length (e.g. u(1), u(2) or U(3)), unary coded, truncated unary coded, Elias Gamma (EG) coded.

iii. Alternatively, furthermore, signaling and/or semantics and/or inference of one or multiple syntax elements signaled in SPS or PPS may be modified such that they are signaled only when the first syntax element satisfies certain conditions.
  a. In one example, the one or multiple syntax elements are those for enabling a coding tool which requires more than one prediction signal, such as bi-prediction or mixed intra and inter coding, or prediction with linear/non-linear weighting from multiple prediction blocks.
  b. In one example, the one or multiple syntax elements may include, but not limited to:
    a) sps_weighted_bipred_flag
    b) sps_bdof_enabled_flag
    c) sps_smvd_enabled_flag
    d) sps_dmvr_enabled_flag
    e) sps_bcw_enabled_flag
    f) sps_ciip_enabled_flag
    g) sps_gpm_enabled_flag
  c. In one example, only when the first syntax element specifies that the CLVS associated with the video unit may contain one or more B slices, the one or multiple syntax elements may be signaled. Otherwise, the signaling is skipped, and the values of the syntax element are inferred.
  d. In one example, when sps_b_slice_allowed_flag is equal to 0, the syntax elements sps_weighted_bipred_flag, sps_bdof_enabled_flag, sps_smvd_enabled_flag, sps_dmvr_enabled_flag, sps_bcw_enabled_flag, sps_ciip_enabled_flag, and sps_gpm_enabled_flag are not signaled and their values are inferred.
    a) In one example, they are all inferred to be 0 when not present.
iv. Alternatively, furthermore, a second syntax element may be signaled in the General constraint information syntax, such as no_b_slice_contraint_flag, to indicate whether the first syntax element shall be equal to 0.
  a. In one example, the semantics of the no_b_slice_contraint_flag is defined as follows:
    no_b_slice_contraint_flag equal to 1 specifies that sps_allowed_slice_idc shall be equal to X (e.g., representing the allowed slice types to be {I, B, P} or {B, P}, {all B}). no_b_slice_constraint_flag equal to 0 does not impose such a constraint.
v. Alternatively, furthermore, it is required that one or multiple syntax elements signaled in the General constraint information syntax shall be equal to 1 if the first syntax element specifies that the CLVS doesn't contain B slices (e.g., only sps_allowed_slice_idc equal to X which represents {I, P}, {all I}, {all P}).
  a. In one example, the one or multiple syntax elements may include, but are not limited to:
    a) no_bcw_constraint_flag
    b) no_ciip_constraint_flag
    c) no_gpm_constraint_flag
    d) no_bdof_constraint_flag
    e) no_dmvr_constraint_flag
vi. Alternatively, furthermore, signaling and semantics of one or multiple syntax elements signaled in dpb_parameters ( ) may be modified such that they are signaled only when the first syntax element satisfies certain conditions.
  a. In one example, the one or multiple syntax elements may include, but not limited to:
    a) max_num_reorder_pics
  b. In one example, when the first syntax element tells no B slice is allowed, the max_num_reorder_pics is not signaled and inferred to be 0.

In PH/SH

2. In the PH/SH, a variable X is used to indicate whether B slice is allowed/used in a picture/slice, and the variable may be derived from the SPS syntax element, and/or a new PH syntax element (e.g., ph_allowed_slice_idc) to specify the allowed slice types, and/or other syntax elements (e.g., the BSliceAllowed used in JVET-R0052).
  1) In one example, the new PH syntax element is added and how to signal this syntax element may depend on the allowed slice types in SPS.
  2) Alternatively, furthermore, signaling and/or semantics and/or inference of one or multiple syntax elements signaled in PH may be modified according to the variable.
    i. In one example, the one or multiple syntax elements are those for enabling a coding tool which requires more than one prediction signal, such as bi-prediction or mixed intra and inter coding, or prediction with linear/non-linear weighting from multiple prediction blocks.
    ii. In one example, the one or multiple syntax elements may include, but not limited to:
      a) ph_collocated_from_l0_flag
      b) mvd_l1_zero_flag
      c) ph_disable_bdof_flag
      d) ph_disable_dmvr_flag
      e) num_l1_weights
    iii. In one example, only when the first syntax element specifies that the picture may contain one or more B slices, the one or multiple syntax elements may be signaled. Otherwise, the signaling is skipped, and the values of the syntax element are inferred.
      a) Alternatively, furthermore, whether to signal the one or more syntax elements may depend on the first syntax elements in bullet 1.1) and 0.2, such as (X being true or 1).
      b) ph_disable_bdof_flag may be signaled only when (sps_bdof_pic_present_flag && X) is true.
      c) ph_disable_dmvr_flag may be signaled only when (sps_dmvr_pic_present_flag && X) is true.
    iv. In one example, when X is equal to 0 (or false), mvd_l1_zero_flag is not signaled, and its values is inferred to be 1.
    v. In one example, the inference of the one or multiple syntax elements are dependent on the value of the first syntax element.
      a) In one example, for the ph_disable_bdof_flag, the following applies:
        If sps_bdof_enabled_flag is equal to 1 and X is equal to 1 (or true), the value of ph_disable_bdof_flag is inferred to be equal to 0.
        Otherwise (sps_bdof_enabled_flag is equal to 0 or X is equal to 0 (or false)), the value of ph_disable_bdof_flag is inferred to be equal to 1.
      b) In one example, for the ph_disable_dmvr_flag, the following applies:
        If sps_dmvr_enabled_flag is equal to 1 and X is equal to 1 (or true), the value of ph_disable_dmvr_flag is inferred to be equal to 0.

Otherwise (sps_dmvr_enabled_flag is equal to 0 or X is equal to 0 (or false)), the value of ph_disable_dmvr_flag is inferred to be equal to 1.
   c) In one example, when ph_temporal_mvp_enabled_flag and rpl_info_in_ph_flag are both equal to 1 and X is equal to 0 (or false), the value of ph_collocated_from_l0_flag is inferred to be equal to 1.
   d) In one example, when X is equal to 0 (or false), num_l1_weights is not signaled and its value is inferred to be 0, and, consequently, weighted prediction parameters for reference picture list 1 are not signaled in the PH or SHs of the picture.

Inference of Syntax Elements

3. For syntax elements which are related to a coding tool X and/or a group of syntax elements which could be present in either A (e.g., a PH) or B (e.g., a SH) but not both, if the A is included in the B, then at least one of indication of presence of those syntax elements may be not signaled, and may be inferred to be 0, i.e., present in B.
   1) In one example, the coding tool X may include one of the following:
      i. In-loop filtering technologies, e.g., deblocking filter, ALF, SAO
      ii. Weighted Prediction
      iii. QP delta information
      iv. RPL information
   2) In one example, the condition 'the A is included in the B' may be defined as 'slice headers referring to the PPS contain the PH syntax structure', or 'current picture only consists of one slice'.
   3) In one example, the 'indication of presence of those syntax elements' may be defined as one or multiple of the following syntax elements:
      i. qp_delta_info_in_ph_flag, rpl_info_in_ph_flag, dbf_info_in_ph_flag, sao_info_in_ph_flag, wp_info_in_ph_flag, alf_info_in_ph_flag
   4) In one example, one or multiple of the following changes are proposed.
      rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure. When slice headers referring to the PPS contain the PH syntax structure, it is a requirement of bitstream conformance that rpl_info_in_ph_flag shall be equal to 0.
      dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0. When slice headers referring to the PPS contain the PH syntax structure, it is a requirement of bitstream conformance that dbf_info_in_ph_flag shall be equal to 0.
      sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure. When slice headers referring to the PPS contain the PH syntax structure, it is a requirement of bitstream conformance that sao_info_in_ph_flag shall be equal to 0.
      alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure. When slice headers referring to the PPS contain the PH syntax structure, it is a requirement of bitstream conformance that alf_info_in_ph_flag shall be equal to 0.
      wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0. When slice headers referring to the PPS contain the PH syntax structure, it is a requirement of bitstream conformance that wp_info_in_ph_flag shall be equal to 0.
      qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure. When slice headers referring to the PPS contain the PH syntax structure, it is a requirement of bitstream conformance that qp_delta_info_in_ph_flag shall be equal to 0.
4. A conformance bitstream shall follow the rule that it is require the setting of NoOutputOfPriorPicsFlag to be equal to 1 for the splicing-point picture that is a CLVS Access Unit (AU) in the spliced bitstream when its POC value is greater than the POC value of the previous picture.
5. Whether to signal a syntax element which indicates inter slices/B slices/P slices is allowed in a picture and/or RPL/WP information, and/or indication of presence of RPL/Weighted Prediction (WP) information may be dependent on the picture type and layer independency is enabled or not.
   1) In one example, the syntax element is not signaled for IRAP pictures and layer independency is enabled.
      i. In one example, ph_inter_slice_allowed_flag in VVC is not signaled for IRAP pictures and layer independency is enabled.
      ii. In one example, slice_type in VVC is not signaled for IRAP pictures and layer independency is enabled.

iii. In one example, ph_slice_type in JVET-R0052 is not signaled for IRAP pictures and layer independency is enabled.
2) In one example, the syntax element is not signaled for IRAP pictures and layer independency is enabled, even the presence of such information tells they are in PH.
i. When gdr_or_irap_pic_flag is equal to 1 and gdr_pic_flag is equal to 0, a new flag called idr_pic_flag is proposed to specify whether the picture associated with the picture header is an Instantaneous Decoding Refresh (IDR) picture. And the following may be applied:
a. When sps_idr_rpl_present_flag is equal to 0, layer independency is enabled, and idr_pic_flag is equal to 1, RPL signaling is not present in the PH, even when the value of rpl_info_in_ph_flag is equal to 1.
b. When sps_idr_rpl_present_flag is equal to 0, layer independency is enabled, and idr_pic_flag is equal to 1, WP signaling is not present in the PH, even when the value of wp_info_in_ph_flag is equal to 1.
6. It is proposed that when sps_video_parameter_set_id is greater than 0 and there is an OLS that contains only one layer with nuh_layer_id equal to the nuh_layer_id of the SPS, or sps_video_parameter_set_id is equal to 0, the value of sps_ptl_dpb_hrd_params_present_flag shall be equal to 1.

Reference List Related
7. The signaling and/or generating of reference picture list may depend on the allowed slice types in a picture of a CLVS.
1) For example, one or multiple syntax elements to build reference list 1 may not be signaled if B-slices are not allowed in a CLVS.
2) For example, one or multiple procedures to build reference list 1 may not be conducted if B-slices are not allowed in a CLVS.

APS Related
8. It is required that two APSs shall not have the same APS_id in a sequence, in a CLVS or in a bit-stream.
1) Alternatively, it is required that two APSs with the same APS type (such as ALF APS or Luma Mapping with Chroma Scaling (LMCS) APS) shall not have the same APS_id in a sequence, in a CLVS or in a bit-stream.
2) Alternatively, it is allowed that two APSs with the same APS type (such as ALF APS or LMCS APS) have the same APS_id, but they must have the same contents in a sequence, in a CLVS or in a bit-stream.
3) Alternatively, it is allowed that two APSs with the same APS type (such as ALF APS or LMCS APS) have the same APS_id. And the APS signaled earlier is replaced by the APS signaled latter.
4) Alternatively, it is allowed that two APSs with the same APS type (such as ALF APS or LMCS APS) have the same APS_id. And the APS signaled latter is ignored.
9. Two different parameter sets (e.g., APS and SPS) may be dependent on each other, and the syntax element or a variable derived according to syntax element in a first parameter set could be used for conditionally signaling another syntax element in a second parameter set.
1) Alternatively, and the syntax element or a variable derived according to syntax element in a first parameter set could be used derive value of another syntax element in a second parameter set.

Noncoded Subpicture Related
10. It is proposed that a boundary of a noncoded subpicture must be treated as a picture boundary.
11. It is proposed that loop filtering (such as ALF/deblocking/SAO) cannot cross a boundary of a noncoded subpicture.
12. It is required that if there is only one subpicture, it cannot be a noncoded subpicture.
13. It is required that a noncoded subpicture cannot be extracted.
14. It is proposed that the information related to noncoded subpicture(s) may be signaled in a Supplemental Enhancement Information (SEI) message.
15. It is required that a noncoded subpicture can only have one slice.
16. It is required that the top-left subpicture cannot be a noncoded subpicture.
17. It is required that at least one of the subpictures is not noncoded subpictures.
18. Whether and/how to code side information related subpictures may be dependent on whether a subpicture is noncoded subpicture.
1) In one example, if it is noncoded subpicture, no need to signal the side information.
19. Alternatively, furthermore, for above requirements, they may be revised as conditionally signaling according to above cases FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, for example, 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (WI-FI) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
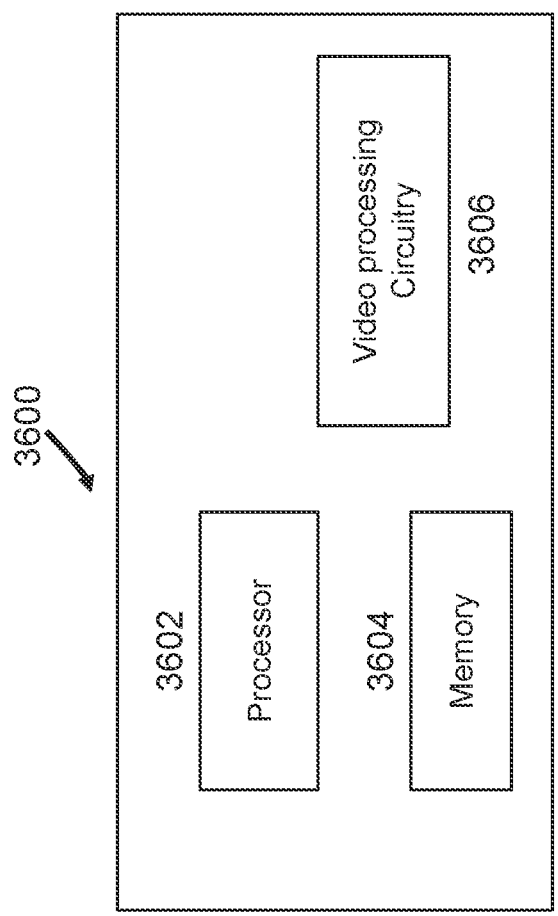
FIG. 2 is a block diagram of a video processing apparatus, in accordance with various examples.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
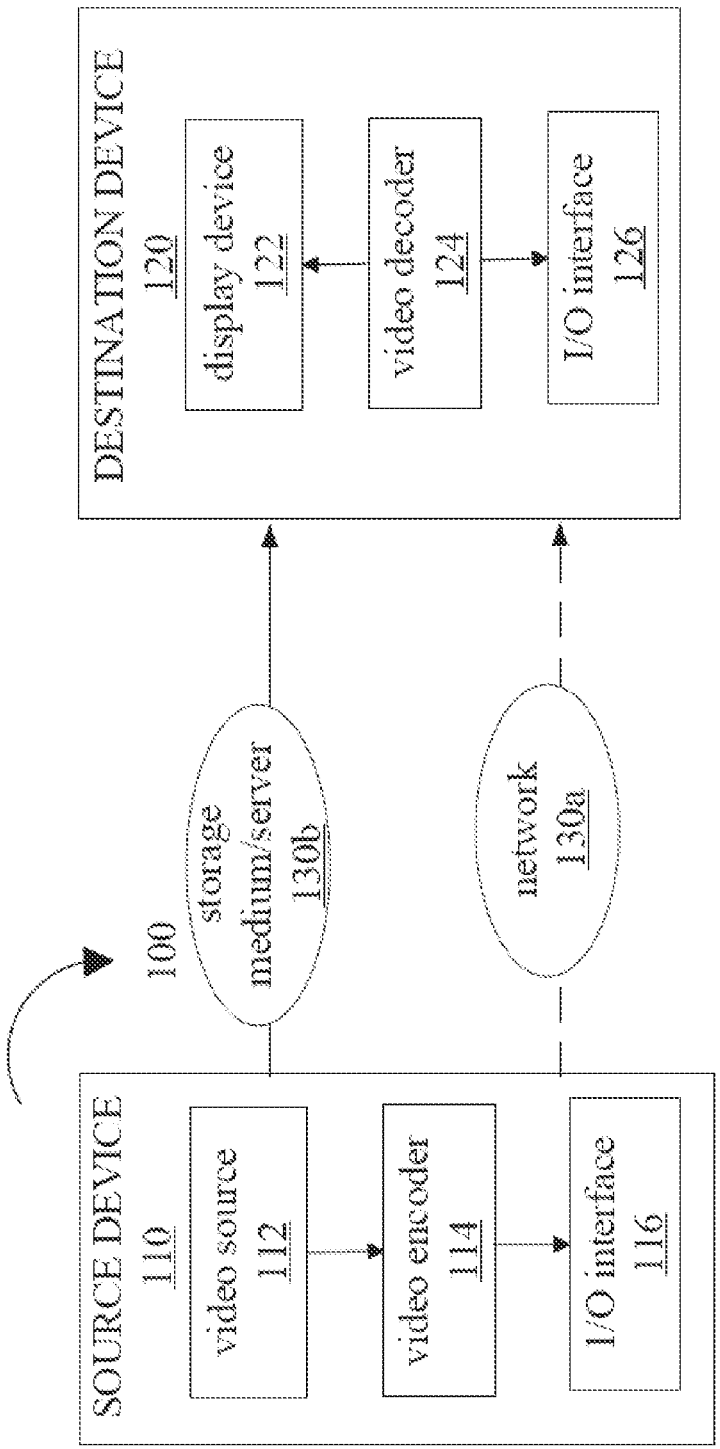
FIG. 4 is a block diagram that illustrates a video coding system, in accordance with various examples.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
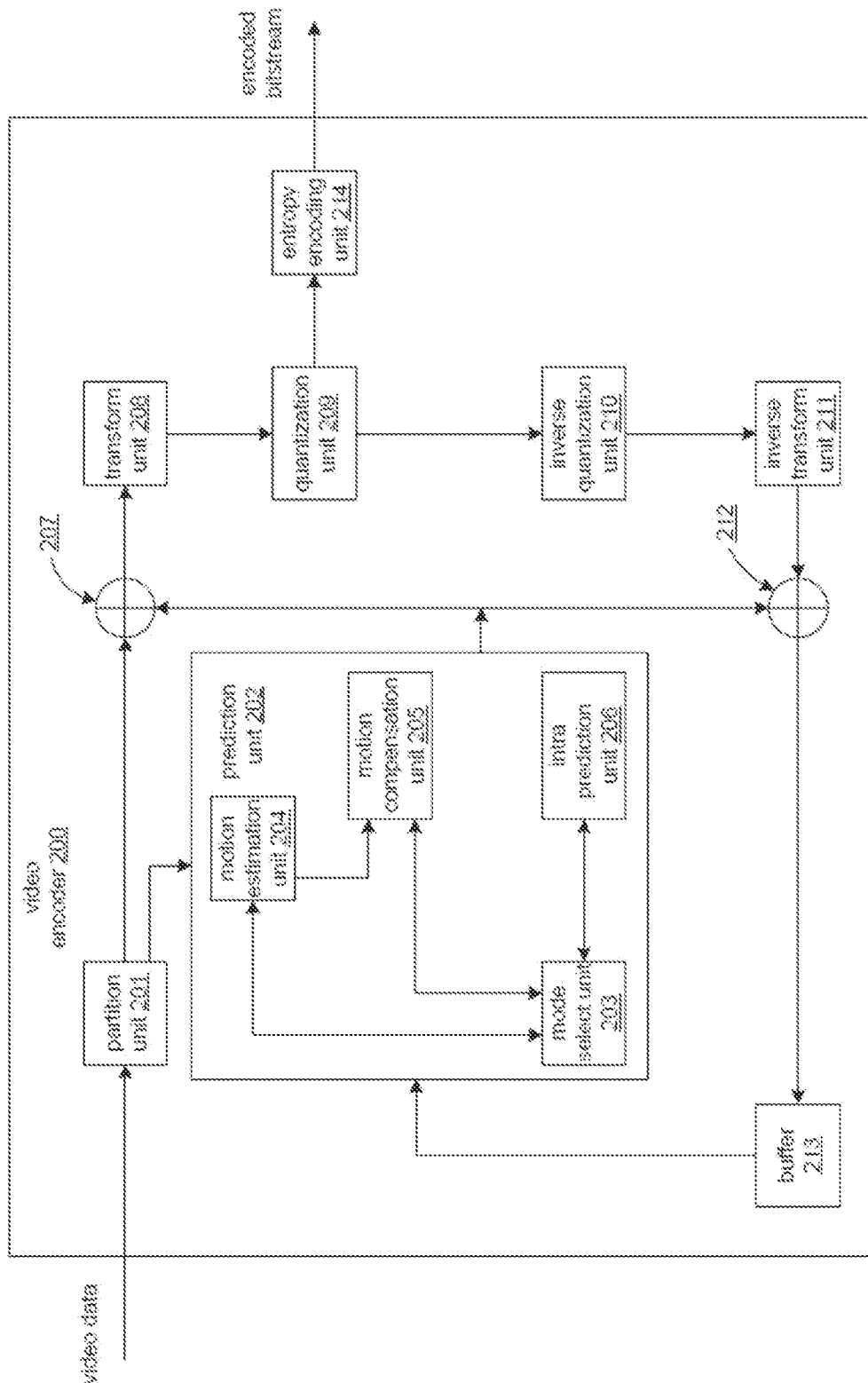
FIG. 5 is a block diagram that illustrates an encoder, in accordance with various examples.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform processing unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter (e.g., based on error results), and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 6:
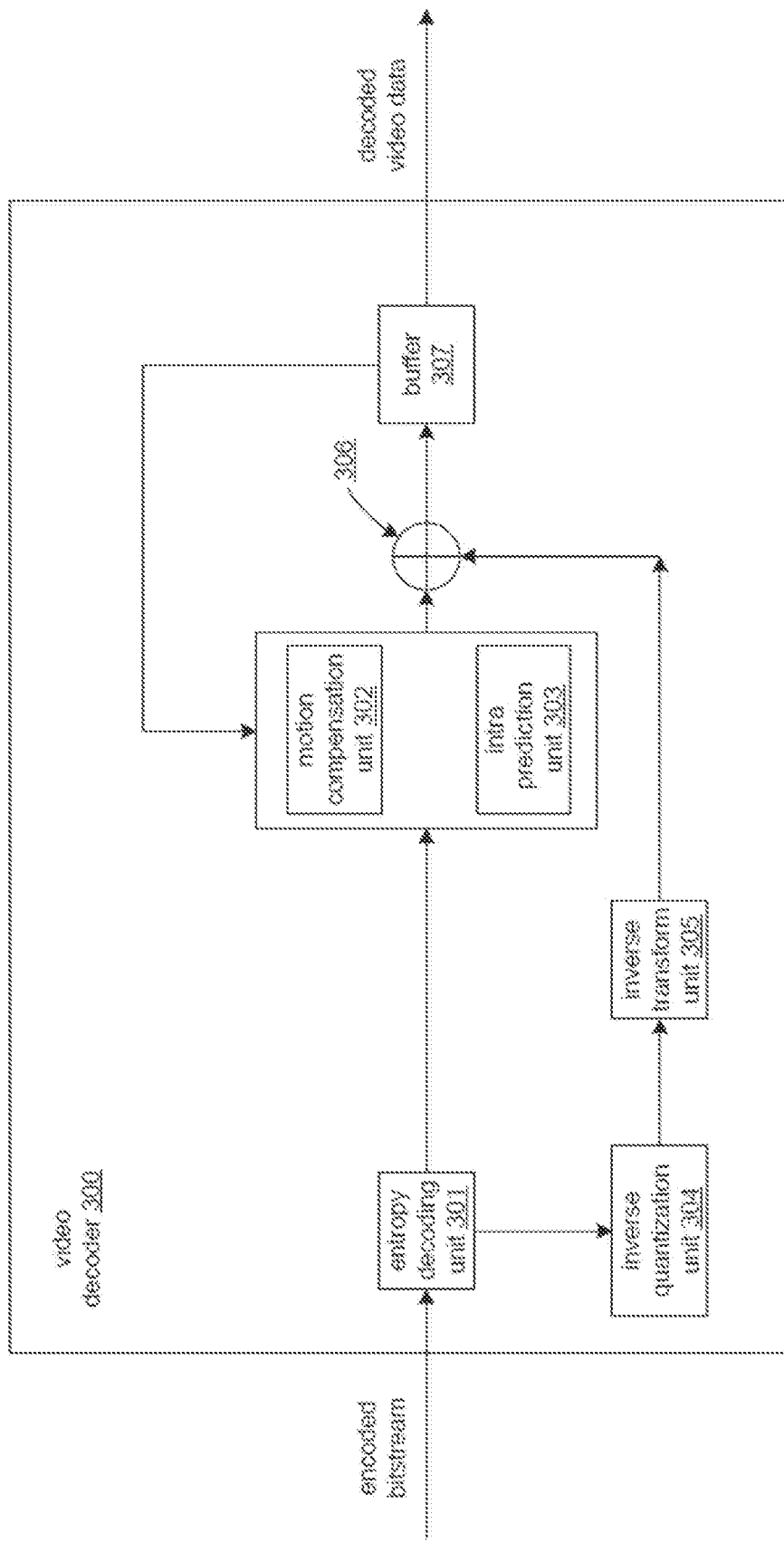
FIG. 6 is a block diagram that illustrates a decoder, in accordance with various examples.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transform unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
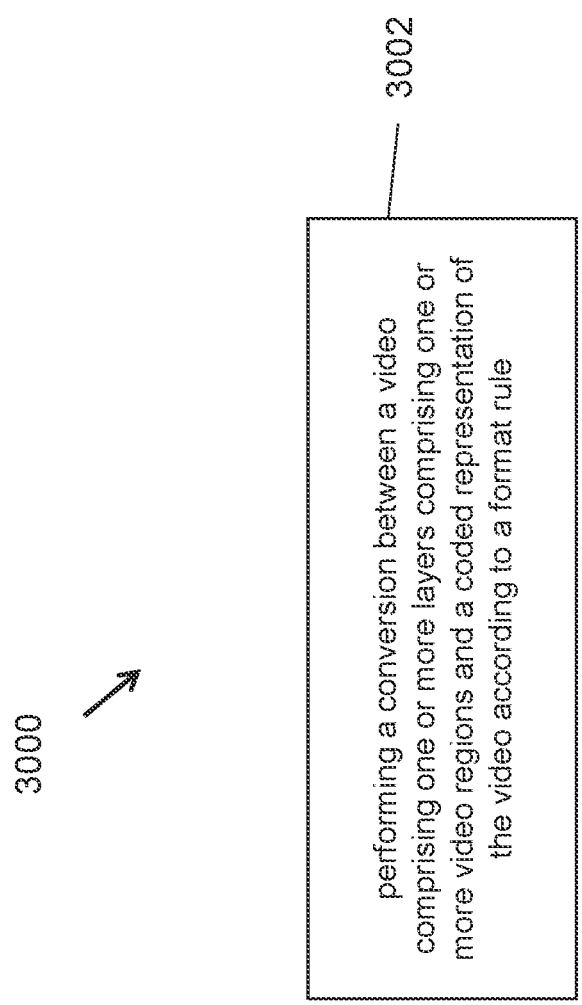
FIG. 3 is a flowchart for an example method of video processing.

1. A video processing method (e.g., method 3000 shown in FIG. 3), comprising performing (3002) a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

2. The method of clause 1, wherein the format rule specifies that the one or more syntax elements include a first syntax element whose value is indicative of slice type combinations allowed in the corresponding video region.

The following clauses show example embodiments of techniques discussed in the previous section (e.g., item 2).

3. The method of any of clauses 1-2, wherein the format rule specifies that a syntax element is included in a picture header or a slice header to indicate whether bidirectionally predicted (B) slices ae allowed or used for a corresponding picture or a slice.

4. The method of clause 3, wherein a syntax element in a sequence parameter set controls presence of the syntax element included in the picture header or the slice header.

The following clauses show example embodiments of techniques discussed in the previous section (e.g., item 3).

5. A video processing method, comprising: performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

6. The method of clause 5, wherein the coding mode includes an in-loop filter or a weighted prediction mode or a quantization parameter delta mode.

The following clauses show example embodiments of techniques discussed in the previous section (e.g., item 7).

7. A video processing method, comprising: performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

8. The method of clause 7, wherein the format rule specifies that due to the allowed slice types excluding bidirectional slices (B-slices), syntax elements corresponding to a reference picture list 1 are omitted from the coded representation.

9. The method of clause 7, wherein the format rule specifies that due to the allowed slice types excluding bidirectional slices (B-slices), a procedure for generation of a reference picture list 1 is disabled for a video picture.

The following clauses show example embodiments of techniques discussed in the previous section (e.g., items 10-15).

10. A video processing method, comprising: performing a conversion between a video comprising one or more video pictures comprising one or more subpictures wherein the coded representation conforms to a format rule, wherein the format rule specifies a processing of a noncoded subpicture of a video picture.

11. The method of clause 10, wherein the format rule specifies that a boundary of the noncoded subpicture is processed as a picture boundary during the conversion.

12. The method of clause 10, wherein the format rule specifies to disable a loop filtering across a boundary of the noncoded picture.

13. The method of clause 10, wherein the format rule disallows the noncoded subpicture to be only subpicture of the video picture.

14. The method of any of clauses 10-13, wherein the format rule specifies that information for decoding assistance of the noncoded subpicture is includes in a supplementary enhancement information syntax element of the coded representation.

15. The method of clause 10, wherein the format rule specifies that the noncoded subpicture is allowed to have at most one slice.

16. The method of any of above clauses, wherein the video region comprises a video picture or a video slice.

17. The method of any of clauses 1 to 16, wherein the conversion comprises encoding the video into the coded representation.

18. The method of any of clauses 1 to 16, wherein the conversion comprises decoding the coded representation to generate pixel values of the video.

19. A video decoding apparatus comprising a processor configured to implement a method recited in one or more of clauses 1 to 18.

20. A video encoding apparatus comprising a processor configured to implement a method recited in one or more of clauses 1 to 18.

21. A computer program product having computer code stored thereon, the code, when executed by a processor, causes the processor to implement a method recited in any of clauses 1 to 18.

22. A method, apparatus or system described in the present document.

A second set of clauses show example embodiments of techniques discussed in the previous section (e.g., items 1-19).

1. A method of video processing (e.g., method 700 as shown in FIG. 7A), comprising: performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

2. The method of clause 1, wherein the one or more conditions include 1) a video parameter set identifier referenced by the sequence parameter set is greater than 0 and there exists an output layer set that contains only one layer having a network abstraction layer (NAL) unit header layer identifier equal to a particular value, or 2) the video parameter set identifier is equal to 0.

3. The method of clause 1 or 2, wherein the syntax element equal to 1 further specifies that a third syntax structure providing general timing and hypothetical reference decoder parameters information and a forth syntax structure providing output layer set timing and hypothetical reference decoder parameters information are allowed to be present in the sequence parameter set.

4. The method of clause 3, wherein the third syntax structure corresponds to general_timing_hrd_parameters( ) syntax structure, and the forth syntax structure corresponds to ols_timing_hrd_parameters( ) syntax structure.

5. The method of any of clauses 1 to 4, wherein the syntax element corresponds to sps_ptl_dpb_hrd_params_present_flag, the first syntax structure corresponds to profile_tier_level( ) syntax structure, and the second syntax structure corresponds to dpb_parameters( ) syntax structure.

6. A method of video processing (e.g., method 710 as shown in FIG. 7B), comprising: performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

7. The method of clause 6, wherein the format rule specifies to further include a first syntax element whose value is indicative of the allowed slice types or slice type combinations allowed in a video region.

8. The method of clause 7, wherein the format rule specifies that the one or more syntax elements are signaled only when the first syntax element satisfies certain conditions.

9. The method of clause 7, wherein the format rule specifies that general constrain information syntax structure includes a second syntax element to indicate whether the first syntax element is equal to 0.

10. The method of clause 7, wherein the format rule specifies that the one or more syntax elements is equal to 1 in case that the first syntax element specifies that no bidirectionally predicted (B) slice is included in the coded layer video sequence.

11. A method of video processing (e.g., method 720 as shown in FIG. 7C), comprising: performing 722 a conversion between a video comprising one or more layers comprising one or more pictures comprising one or more slices and a bitstream of the video according to a format rule, and wherein the format rule specifies that a syntax element is included in a picture header or a slice header to indicate whether bidirectionally predicted (B) slices are allowed or used for a corresponding picture or slice of the video.

12. The method of clause 11, wherein the format rule specifies that a syntax element in a sequence parameter set controls presence of the syntax element included in the picture header or the slice header.

13. The method of clause 11, wherein the format rule specifies that how to signal the syntax element in the picture header depends on allowed slice types in a sequence parameter set.

14. The method of clause 11, wherein the format rule specifies that the syntax element controls signaling and/or semantics and/or inference of one or more syntax elements included in the picture header.

15. A method of video processing (e.g., method 730 as shown in FIG. 7D), comprising: performing 732 a conversion between a video comprising one or more layers comprising one or more pictures comprising one or more slices and a bitstream of the video according to a format rule, and wherein the format rule specifies that one or more syntax elements related to enablement or use of a coding mode at a slice level are included at most once between either a picture header or a slice header according to a second rule.

16. The method of clause 15, wherein the coding mode includes an in-loop filtering or a weighted prediction mode or a quantization parameter delta mode or reference picture list information.

17. The method of clause 15, wherein the format rule specifies that the slice header referring to a picture parameter set contains a picture header syntax structure, it is a requirement of bitstream conformance that values of the one or more syntax elements are equal to 0.

18. A method of video processing (e.g., method 740 as shown in FIG. 7E), comprising: performing 742 a conversion between a video comprising one or more pictures and a bitstream of the video according to a format rule, and wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

19. The method of clause 18, wherein the format rule specifies to set the value of the variable to be equal to 1 for the current picture that is a splicing-point picture and a coded layer video sequence access unit in the bitstream, in case that the picture order count value of the current picture is greater than a picture order count value of a previous picture.

20. A method of video processing (e.g., method 750 as shown in FIG. 7F), comprising: performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

21. The method of clause 20, wherein the format rule specifies that the syntax element is not included in case that i) the picture type is an intra random access point picture and ii) the layer independency is enabled.

22. The method of clause 21, wherein the format rule specifies that the syntax element is not included in case that i) and ii) are satisfied, regardless of another syntax element indicating a presence of the prediction information in a picture header.

23. The method of clause 21 or 22, wherein the format rule specifies to further include a variable specifying whether the picture associated with the picture header is an instantaneous decoding refresh (IDR) picture, in case that the picture is the intra random access point picture.

24. The method of any of clauses 21 to 23, wherein the format rule specifies that the indication of presence of the prediction information is not present in the picture header.

25. A method of video processing (e.g., method 760 as shown in FIG. 7G), comprising: performing 762 a conversion between a video comprising one or more pictures and a bitstream of the video according to a format rule, wherein the format rule specifies that use of a reference picture list during the conversion of a coded layer video sequence depends on allowed slice types in a picture corresponding to the coded layer video sequence of the video.

26. The method of clause 25, wherein the format rule specifies that due to the allowed slice types excluding bidirectional slices (B-slices), syntax elements corresponding to a reference picture list 1 are omitted from the bitstream.

27. The method of clause 25, wherein the format rule specifies that due to the allowed slice types excluding bidirectional slices (B-slices), a procedure for generation of a reference picture list 1 is disabled for a video picture.

Figure 7H:
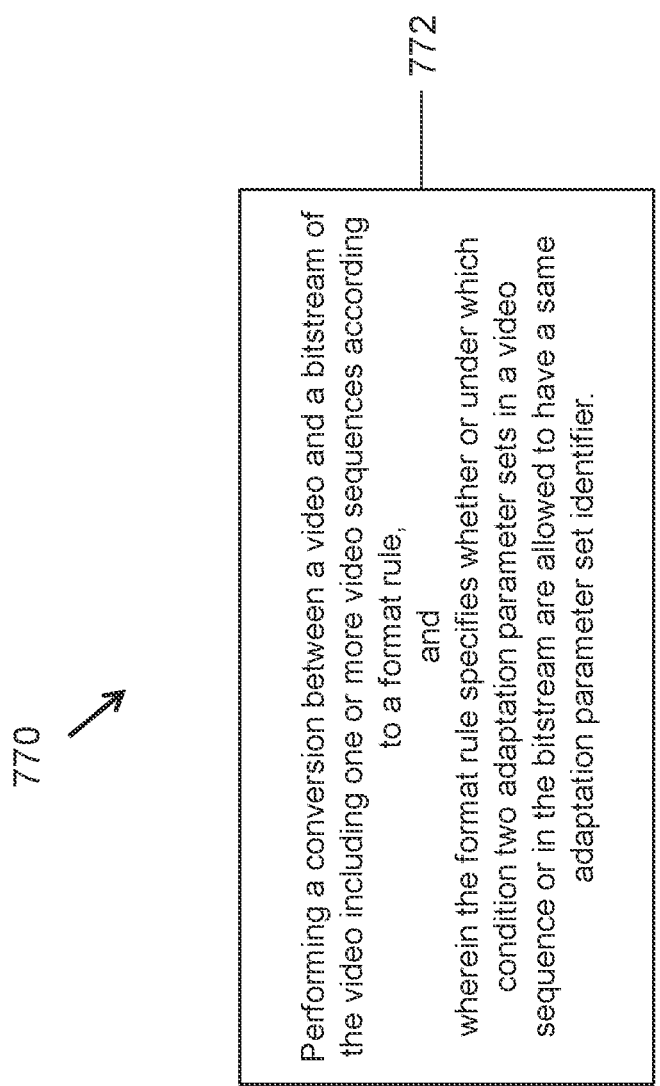

28. A method of video processing (e.g., method 770 as shown in FIG. 7H), comprising: performing 772 a conversion between a video and a bitstream of the video including one or more video sequences according to a format rule, and wherein the format rule specifies whether or under which condition two adaptation parameter sets in a video sequence or in the bitstream are allowed to have a same adaptation parameter set identifier.

29. The method of clause 28, wherein the format rule specifies that the two adaptation parameter sets do not have the same adaptation parameter set identifier.

30. The method of clause 28, wherein the two adaptation parameter sets do not have the same adaptation parameter set identifier in case that the two adaptation parameter sets have a same adaptation parameter set type.

31. The method of clause 28, wherein the two adaptation parameter sets have the same adaptation parameter set identifier in case that 1) the two adaptation parameter sets have a same adaptation parameter set type and have same contents or 2) the two adaptation parameter sets have a same adaptation parameter set type.

32. A method of video processing (e.g., method 780 as shown in FIG. 7I), comprising: performing 782 a conversion between a video and a bitstream of the video according to a format rule, and wherein the format rule specifies that a first parameter set and a second parameter set are dependent on each other such that whether or how to include a syntax element in the second parameter set is based on the first parameter set.

33. The method of clause 32, wherein the format rule specifies that the syntax element in the second parameter set is conditionally included or derived based on a syntax element or a variable that is derived according to another syntax element in the first parameter set.

Figure 7J:
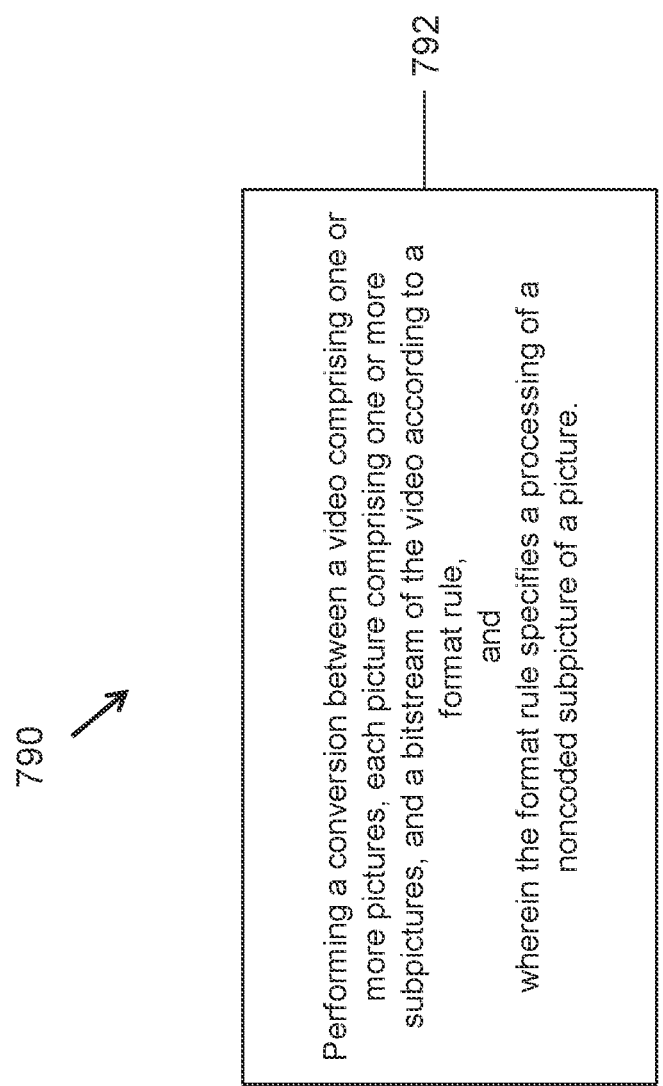

34. A method of video processing (e.g., method 790 as shown in FIG. 7J), comprising: performing 792 a conversion between a video comprising one or more pictures, each picture comprising one or more subpictures, and a bitstream of the video according to a format rule, wherein the format rule specifies a processing of a noncoded subpicture of a picture.

35. The method of clause 34, wherein the format rule specifies that a boundary of the noncoded subpicture is processed as a picture boundary during the conversion.

36. The method of clause 34, wherein the format rule specifies to disable a loop filtering across a boundary of the noncoded subpicture.

37. The method of clause 34, wherein the format rule disallows the noncoded subpicture to be only subpicture of the video picture.

38. The method of clause 34, wherein the format rule specifies not to extract the noncoded subpicture during the conversion.

39. The method of clause 34, wherein the format rule specifies that information for decoding assistance of the noncoded subpicture is included in a supplementary enhancement information syntax element of the bitstream.

40. The method of clause 34, wherein the format rule specifies that the noncoded subpicture is allowed to have at most one slice.

41. The method of clause 34, wherein the format rule specifies that the noncoded subpicture is not a top-left subpicture of the picture.

42. The method of clause 34, wherein the format rule specifies that at least one of the one or more subpictures is a coded subpicture.

43. The method of clause 34, wherein the format rule specifies whether and/or how to code side information related to the one or more subpictures is dependent on whether a subpicture is a coded or noncoded.

44. The method of any of clauses 1 to 43, wherein the conversion includes encoding the video into the bitstream.

45. The method of any of clauses 1 to 43, wherein the conversion includes decoding the video from the bitstream.

46. The method of clauses 1 to 43, wherein the conversion includes generating the bitstream from the video, and the method further comprises: storing the bitstream in a non-transitory computer-readable recording medium.

47. A video processing apparatus comprising a processor configured to implement a method recited in any one or more of clauses 1 to 46.

48. A method of storing a bitstream of a video, comprising, a method recited in any one of clauses 1 to 46, and further including storing the bitstream to a non-transitory computer-readable recording medium.

49. A computer readable medium storing program code that, when executed, causes a processor to implement a method recited in any one or more of clauses 1 to 46.

50. A computer readable medium that stores a bitstream generated according to any of the above described methods.

51. A video processing apparatus for storing a bitstream representation, wherein the video processing apparatus is configured to implement a method recited in any one or more of clauses 1 to 46.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, for example, internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
performing a conversion between a video comprising one or more pictures and a bitstream of the video according to a format rule, wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set, and wherein the syntax element equal to 1 further specifies that a third syntax structure providing general timing information related with hypothetical reference decoder parameters and a forth syntax structure providing output layer set timing information related with hypothetical reference decoder parameters are allowed to be present in the sequence parameter set.

2. The method of claim 1, wherein the one or more conditions are related with a video parameter set identifier referenced by the sequence parameter set.

3. The method of claim 2, wherein the one or more conditions are further related with whether there exists an output layer set that contains only one layer having a network abstraction layer (NAL) unit header layer identifier equal to a particular value.

4. The method of claim 1, wherein the one or more conditions include: 1) a video parameter set identifier referenced by the sequence parameter set is greater than 0 and there exists an output layer set that contains only one layer having a network abstraction layer (NAL) unit header layer identifier equal to a particular value; or 2) the video parameter set identifier is equal to 0.

5. The method of claim 1, wherein the third syntax structure corresponds to general timing hrd_parameters( ) syntax structure, and the forth syntax structure corresponds to ols timing hrd_parameters( ) syntax structure.

6. The method of claim 1, wherein the syntax element corresponds to sps_ptl dpb hrdparamspresent flag, the first syntax structure corresponds to profile tier level( ) syntax structure, and the second syntax structure corresponds to dpb_parameters( ) syntax structure.

7. The method of claim 1, wherein the conversion includes encoding the video into the bitstream.

8. The method of claim 1, wherein the conversion includes decoding the video from the bitstream.

9. An apparatus for processing video data comprising a processor and a non-transitory memory with instructions thereon, wherein the instructions upon execution by the processor, cause the processor to:
perform a conversion between a video comprising one or more pictures and a bitstream of the video according to a format rule, wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set, and wherein the syntax element equal to 1 further specifies that a third syntax structure providing general timing information related with hypothetical reference decoder parameters and a forth syntax structure providing output layer set timing information related with hypothetical reference decoder parameters are allowed to be present in the sequence parameter set.

10. The apparatus of claim 9, wherein the one or more conditions are related with a video parameter set identifier referenced by the sequence parameter set.

11. The apparatus of claim 10, wherein the one or more conditions are further related with whether there exists an output layer set that contains only one layer having a network abstraction layer (NAL) unit header layer identifier equal to a particular value.

12. The apparatus of claim 9, wherein the one or more conditions include: 1) a video parameter set identifier referenced by the sequence parameter set is greater than 0 and there exists an output layer set that contains only one layer having a network abstraction layer (NAL) unit header layer identifier equal to a particular value; or 2) the video parameter set identifier is equal to 0.

13. The apparatus of claim 9, wherein the third syntax structure corresponds to general timing hrd_parameters( ) syntax structure, and the forth syntax structure corresponds to ols timing hrd_parameters( ) syntax structure.

14. The apparatus of claim 9, wherein the syntax element corresponds to sps_ptl dpb hrdparamspresent flag, the first syntax structure corresponds to profile tier level( ) syntax structure, and the second syntax structure corresponds to dpb_parameters( ) syntax structure.

15. A non-transitory computer-readable storage medium storing instructions that cause a processor to:
perform a conversion between a video comprising one or more pictures and a bitstream of the video according to a format rule, wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set, and wherein the syntax element equal to 1 further specifies that a third syntax structure providing general timing information related with hypothetical reference decoder parameters and a forth syntax structure providing output layer set timing information related with hypothetical reference decoder parameters are allowed to be present in the sequence parameter set.

16. The medium of claim 15, wherein the one or more conditions include: 1) a video parameter set identifier referenced by the sequence parameter set is greater than 0 and there exists an output layer set that contains only one layer having a network abstraction layer (NAL) unit header layer identifier equal to a particular value; or 2) the video parameter set identifier is equal to 0.

17. The medium of claim 15, wherein the third syntax structure corresponds to general timing hrdparameters( )syntax structure, and the forth syntax structure corresponds to ols timing hrdparameters( )syntax structure.

18. A non-transitory computer-readable recording medium storing a bitstream of a video which is generated by a method performed by a video processing apparatus, wherein the method comprises:
generating the bitstream of the video comprising one or more pictures and a bitstream of the video according to a format rule, wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set, and wherein the syntax element equal to 1 further specifies that a third syntax structure providing general timing information related with hypothetical reference decoder parameters and a forth syntax structure providing output layer set timing information related with hypothetical reference decoder parameters are allowed to be present in the sequence parameter set.

19. The medium of claim 18, wherein the one or more conditions include: 1) a video parameter set identifier referenced by the sequence parameter set is greater than 0 and there exists an output layer set that contains only one layer having a network abstraction layer (NAL) unit header layer identifier equal to a particular value; or 2) the video parameter set identifier is equal to 0.

20. The medium of claim 18, wherein the third syntax structure corresponds to general timing hrdparameters( )syntax structure, and the forth syntax structure corresponds to ols timing hrdparameters( )syntax structure.

\* \* \* \* \*